June 25, 1963 W. M. TURNER ETAL 3,094,797
CONTROL MECHANISM FOR ROTARY PRESSING MACHINES
Filed April 4, 1960 5 Sheets-Sheet 1

INVENTORS
WILLIAM M. TURNER
DONALD B. LUCIUS
BY *Dugger & Johnson*

ATTORNEYS

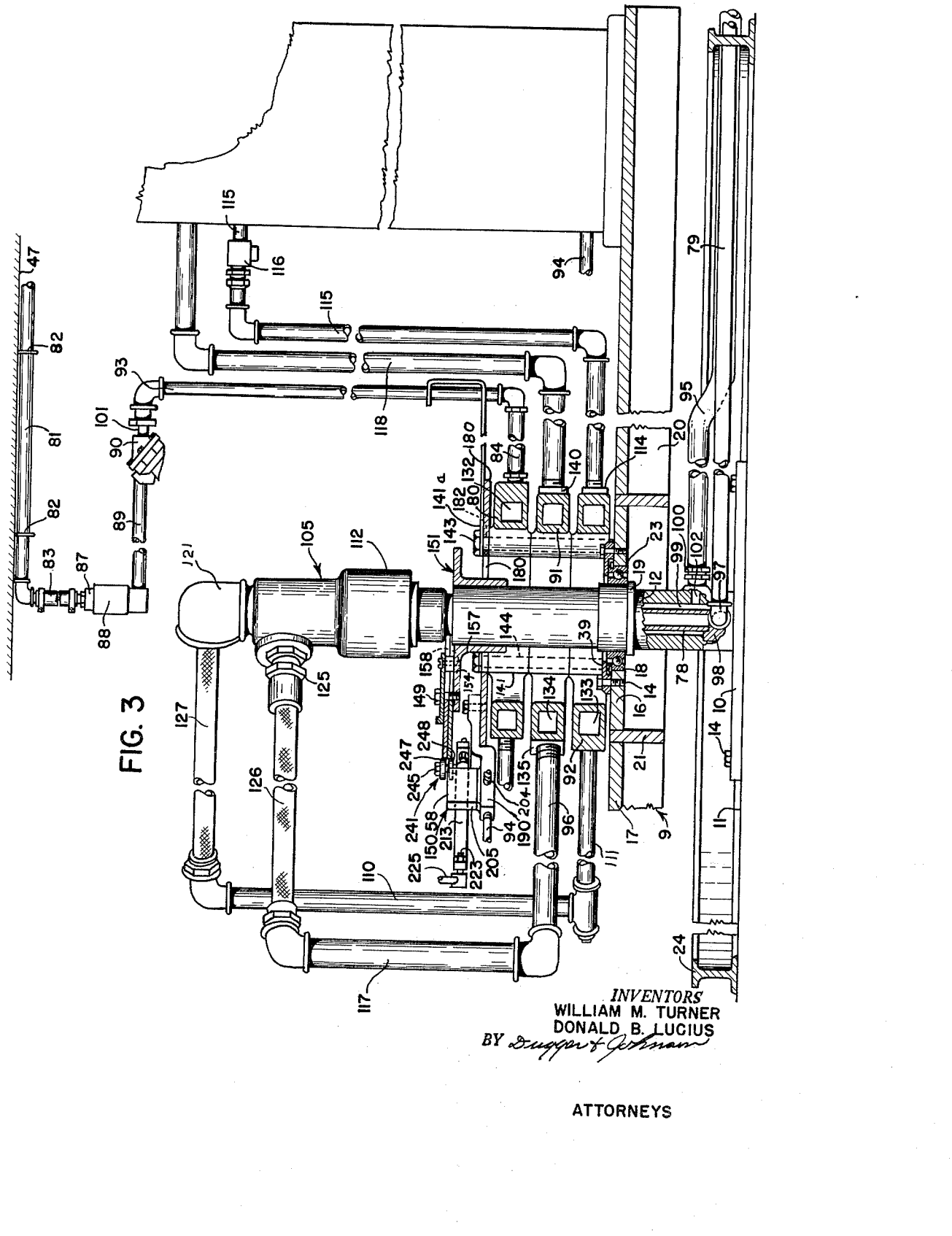

June 25, 1963 W. M. TURNER ETAL 3,094,797
CONTROL MECHANISM FOR ROTARY PRESSING MACHINES
Filed April 4, 1960 5 Sheets-Sheet 3
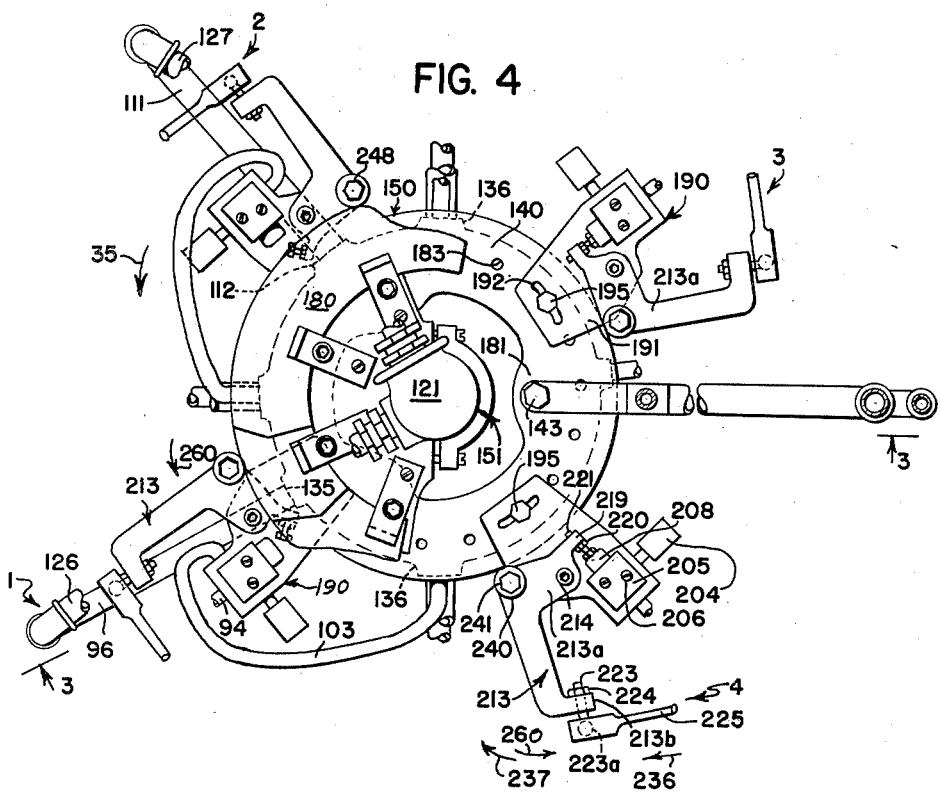
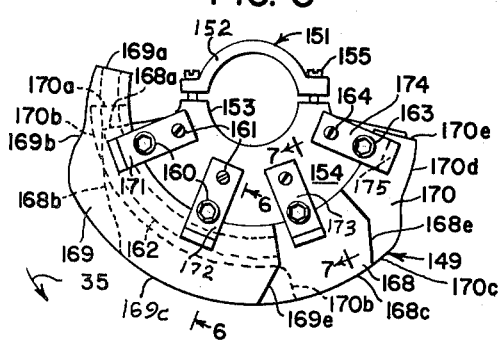
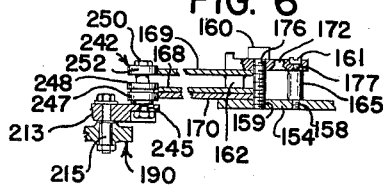
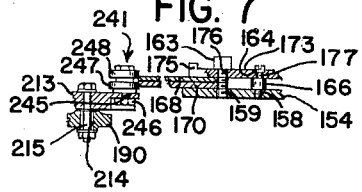
INVENTORS
WILLIAM M. TURNER
DONALD B. LUCIUS
BY *Dugger & Johnson*
ATTORNEYS

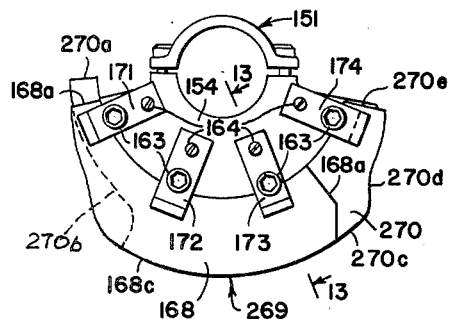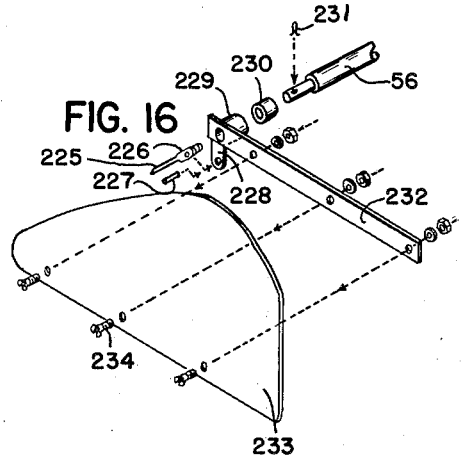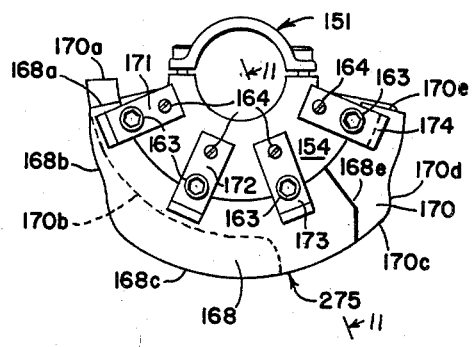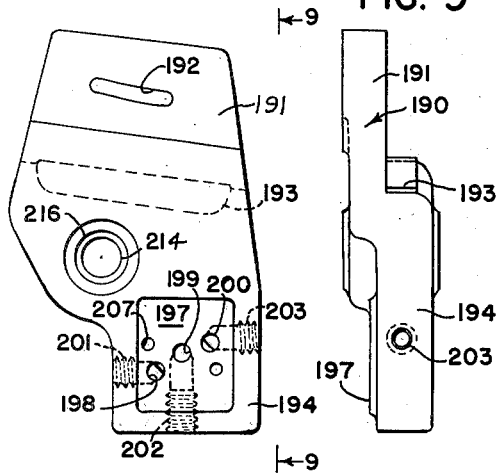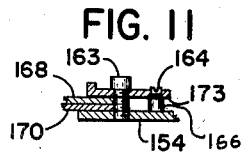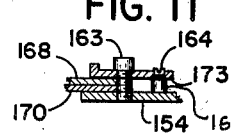
*INVENTORS*
WILLIAM M. TURNER
DONALD B. LUCIUS
ATTORNEYS United States Patent Office 3,094,797
Patented June 25, 1963

3,094,797
CONTROL MECHANISM FOR ROTARY PRESSING MACHINES
William M. Turner, Excelsior, and Donald B. Lucius, Bloomington, Minn., assignors to The Unipress Company, Incorporated, Minneapolis, Minn., a corporation of Minnesota
Filed Apr. 4, 1960, Ser. No. 19,542
17 Claims. (Cl. 38—22)

This invention relates to improvements in a rotary pressing machine of a type having a plurality of individual presses mounted on a platform at a low elevation which is arranged to be rotated about a vertical axis, said pressing machine being exemplified in Patent 2,669,044 and various other patents of the prior art. More particularly this invention relates to new and improved control mechanism for opening a press when it reaches the operator station and automatically closing the press after the rotary press has passed the operator station, and includes new and improved safety features.

Most modern pressing machines of this type as exemplified in the aforementioned patent and other patents of the prior art utilized separate individual presses of the type having steam heated pressing heads and usually also have steam heated bucks. The mechanism in each press for moving the head against the buck for pressing is almost always an air motor which is controlled automatically by rotation of the common platform on which the presses are collectively mounted. Commonly, a pipe having a rotary gland connected thereto is lined coaxially with the axis of rotation of the platform and compressed air is conducted therethrough to the rotary platform and thence to the individual presses thereon so as to serve as an air supply for each press. Structure for conducting steam and air to the presses and conducting the condensate away from the presses is exemplified and disclosed in our co-pending application Serial Number 760,777, filed September 12, 1958, now U.S. Patent 3,001,304, issued September 26, 1961, which is incorporated herein by reference.

Controls for each press are provided for automatically and appropriately valving the air supply to each press carried on the platform to accomplish actuation of each press to and from a closed position as the presses are moved through a circular path of motion by said platform. The control mechanism of the prior art has not proved satisfactory in that it is difficult to maintain, many times the parts are hard to replace, and that an occasional stray object would open the press, or change the sequence of opening of the press. Additionally there has been encountered the difficulty that where the presses are automatically opened and closed, the individual presses can only be opened from definite locations around the turntable in contrast to being able to open the presses at any location around the pressing machine. Further, even though once the press has been opened, most of the presses of the prior art have been subject to being closed at points other than immediately past the operator station, and therefore, a person passing the open press would be in danger of being caught if the press were operated to close position by a stray object. Further, using the control mechanism of the prior art it has been difficult, if not impossible, to adjust the timing of the opening and closing of the individual presses to the exact point of the rotational cycle of the turntable that is desired.

It is an object of this invention to solve the aforementioned problems by providing new and improved control mechanism for a rotary pressing machine wherein the presses are operated by air or other fluids. It is a further object of this invention to provide for rotary pressing machines a new and improved mechanism mounted adjacent to the rotational axis of the machine for controlling the application of fluids to the individual presses to move said presses between a press open and a press close position. It is an additional object of this invention to provide safety mechanism located adjacent to or on each individual press of a rotary pressing machine that may be selectively operated to control application of fluid to the press whereby said press is moved to an open position.

It is still a further object of this invention to provide control mechanism for rotary pressing machines that permits adjusting the time of opening and closing of the individual presses to any desired point of the cycle of rotation of the pressing machine. It is still another object of this invention to provide new and improved safety mechanism for rotary pressing machines that permits the individual presses to be opened at any point in the cycle and hold said presses in said opened condition until they have been rotated through the operator station.

It is still an additional object of this invention to provide new and improved control mechanism for a rotary pressing machine that includes for each press, a valve which may be readily replaced, and that is located adjacent to the rotational axis of the pressing machine and above the elevation of the rotary turntable of said pressing machine.

Other and further objects of the invention are those inherent in the invention herein illustrated, described and claimed and will be apparent as the description proceeds.

To the accomplishment of the aforegoing and related ends, this invention then comprises the features hereinafter fully described and particularly pointed out in the claims, the description setting forth in detail certain illustrative embodiments of the invention, these being indicative, however, of but a few of the various ways in which the principles of the invention may be employed.

The invention is illustrated by reference to the drawings, in which corresponding numerals refer to the same parts and in which:

FIGURE 3 is a schematic vertical view, partly in section, of the control mechanism of this invention, the rotary gland and manifold means and the fluid connections to a press on the turntable, said view being generally taken along the line and looking in the direction of the arrows 3—3 of FIGURE 4;

FIGURE 4 is a plan view of the control mechanism, and the rotary gland and manifold means illustrative in FIGURE 3;

FIGURE 5 is a horizontal plan view of the first embodiment of the cam subassembly which is illustrated in FIGURE 4, said subassembly being used to operate two different size presses.

FIGURE 6 is a fragmentary vertical section taken along the line and looking in the direction of arrows 6—6 of FIGURE 5 to illustrate the mounting of various cams relative to one another;

FIGURE 7 is a fragmentary vertical section taken along the line and in the direction of arrows 7—7 of FIGURE 5 to further illustrate the mounting of the cams illustrated in FIGURE 5;

FIGURE 8 is a plan view of the valve manifold;

FIGURE 9 is a vertical view of the valve manifold taken along the line and looking in the direction of the arrows 9—9 of FIGURE 8;

FIGURE 10 illustrates the cam assembly provided for opening and closing the presses when only the small type presses are mounted on a rotary turntable;

FIGURE 11 is a fragmentary vertical section taken along the line and looking in the direction of the arrows 11—11 of FIGURE 10 to illustrate the mounting of the opening and closing of cams for only small type presses;

FIGURE 12 is a plan view of the cam assembly for controlling the actuation of the individual presses mounted on a rotary pressing machine having only large size presses;

FIGURE 13 is a fragmentary vertical section taken along the line and in the direction of the arrows 13—13 of FIGURE 12 of the opening and closing cams for only large presses;

FIGURE 16 is an exploded view of a flag arm assembly and the mounting thereof.

Figure 1:
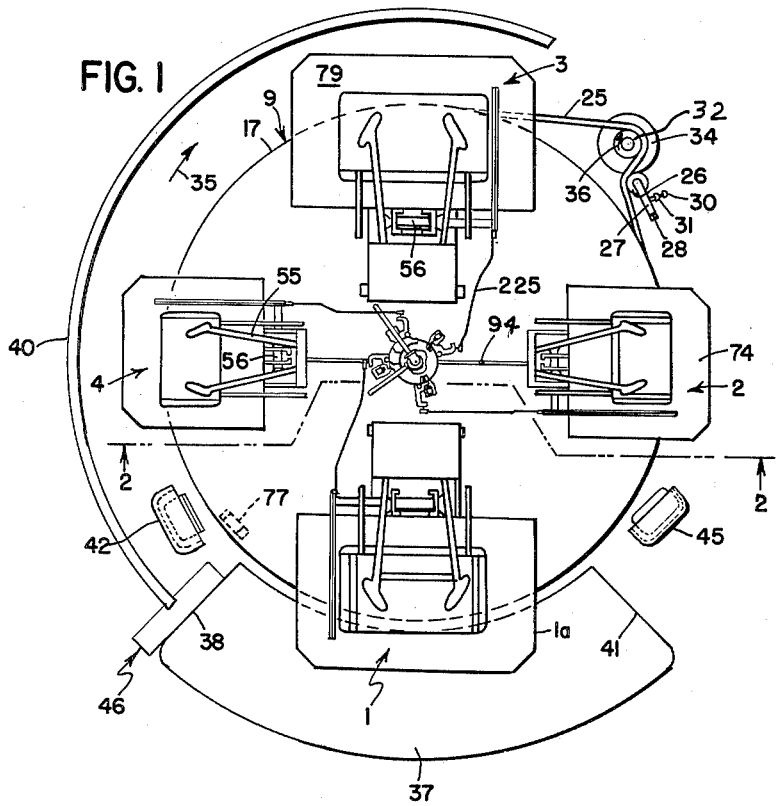
FIGURE 1 is a schematic plan view of a representative type of pressing machine embodying the present invention, said pressing machine having two different size presses mounted on the rotary turntable thereof.

In general, it may be stated that rotary pressing machines of the type of which the present invention is an improvement consist of a rotary turntable of a low elevation that is adapted to be placed upon the floor and upon which there are mounted a plurality of individual pressing machines. The individual presses may be the laundry or garment pressing type and may have the same or different types of bucks and heads or interchangeable bucks and heads for pressing the same or different portions of garments or laundry items. Additionally the individual presses mounted on the rotary turntable may be of varying sizes.

While the rotary pressing machines of this type may be built as a unitary structure, for ease in manufacture and reduction in cost, it has been found that ordinary individual air driven, steam heated pressing machines of a design that are normally mounted directly on a floor may be advantageously used, such individual pressing machines being mounted in regularly spaced relationship around the periphery of the rotary turntable. In such mechanical organization, the presses are rotated one at a time in front of an operator station. At, or slightly ahead of the operator section, a press is automatically controlled by the rotary movement so as to actuate the press to an "open press position" and the operator may without moving from her position, remove the pressed garment and lay an unpressed garment on the buck. Usually the rotation of the pressing machine rotary platform is continuous (but it may be operator-controlled), the removal of the pressed garment and replacement of the unpressed garment on the bucks of the several presses being effected while each press moves at its regular pace in succession through the operator station. Then as each press of the pressing machine progresses in succession along its rotary path of motion, it reaches a position adjacent to, but slightly beyond the operating station where provision is made for automatically actuating controls of each press to cause the respective presser head to move against the buck into pressing relationship therewith.

In the prior art presses, valve controls were provided on each press and were made to be operated by various means, such as cams mounted on the floor or upon supports which were engaged by the appropriate mechanism on the presses as each press moved past a predetermined station to inject air into the air motors of the respective press, said supports and cams being located adjacent the outer periphery of the turntable. The press was then closed automatically and then remained closed as long as air was continued to be supplied during the course of travel of the press around its circular path of motion. At a predetermined station, known as the "opening station" appropriate valve controls on each press were provided, and arranged to be actuated by other cams or other mechanisms, such as timers, so as to release the air line pressure to permit the press to open, and thus be in an open position when it reaches the operator station. In the usual prior art machines, the bucks and heads of the presses are continuously heated by incoming steam which enters through the steam line and the condensate is continuously or periodically withdrawn through the condensate return line.

It is within this class of pressing machines that the invention herein described constitutes improvements. For purposes of illustration, but not by the way of limitation there is herein illustrated a rotary pressing machine resembling that shown in Patent 2,669,044 and in our copending application, Serial Number 760,777, filed September 12, 1958.

Figure 2:
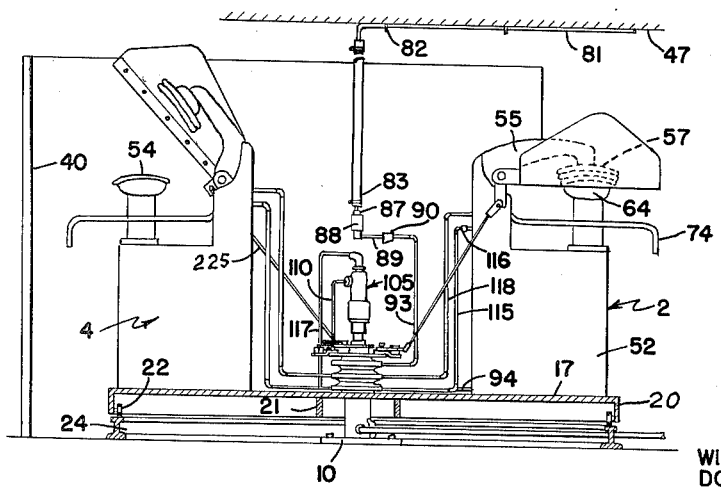
FIGURE 2 is a schematic vertical sectional view taken along the line and in the direction of the arrows 2—2 of FIGURE 1.

Referring to the drawings, particularly to FIGURES 1–3, the pressing machine includes a base plate 10 which is adapted to be placed or bolted to the floor 11 or base on which the pressing machine has been installed. Upon the plate 10 there is mounted a central stationary tubular pivot housing 12 which serves to support a suitable bearing retainer 19 for retaining the pilot bearings 18. The pilot bearings may be of a suitable ball or sleeve type which are mounted within the annular main flange 16 of the circular rotary frame plate 17. The bearing 18 is usually constructed to serve as a thrust bearing so as to receive any weight of the load that may be presented at the center of the rotary frame 9.

The plate 17 is preferably of circular shape and near its peripheral portions is reinforced by concentric ring channels 20 and 21. The aforementioned plate may be welded to the inner periphery of the ring channel 20 and to the outer periphery of ring channel 21.

A plurality of curved plate sections 39 are bolted to the main flange 16 and extend radially inwardly to rest on the bearing structure 18 or else be appropriately secured to said bearing structure. Through the aforementioned structure, the turntable is mounted to rotate about the stationary pivot housing 12.

A plurality of radial stiffening webs (not shown) extend between the ring channels 20 and 21 to reinforce the rotary frame plates. Secured to the inner periphery of the outer ring channel 20 are a plurality of wheels 22. Greater rigidity is provided by placing two or more of the wheels 22 under each of the presses where they are mounted upon the rotary frame plate 17 so that the plate is braced against vibration due to the opening and closing of the presses. The wheels 22 may have rubber tires, if desired, and the wheels may be mounted to run directly on the floor 11 when the floor has sufficient evenness. However, where the installation is made on a rough or uneven floor, it is preferable to place a circular metal track 24 along the path where the wheels 22 track.

For rotating the rotary frame 17 and all the elements carried thereon, there is provided a belt 25 which may be a chain belt, as shown in FIGURE 1, which passes over a pulley 26 that is mounted upon a radial arm 27, the arm being pivoted at 28 to the floor. An adjustment screw 30 mounted in the stationary bracket 31 is positioned so as to bear against the arm 27 and move the arm arcuately and thus permit tightening or loosening of the belt 25. The belt 25 also runs over the drive pulley 32. The pulley 32 rotates at a slower speed and is preferably driven by an electric motor 34 through a gear box. It is preferable to use a motor 34 which is capable of speed variations, such as a wound-rotor repulsion induction motor, a shunt type current motor or the like. It is perfectly feasible to utilize an air driven motor 34 of constant or variable speed where such is desired. The "ON-OFF" switch, the speed controls for motor 34 for controlling speeds and the operation thereof, and the EMERGENCY control may be mounted on the control panel 46, which forms a vertical fence at the left of the terminating edge 38 of the operator station 37. Rotation of the frame plate is in the direction of the arrow 35 and the rotation of the drive pulley is in the direction of the arrow 36.

Upon the rotary plate 17 there are mounted a plurality of pressing machines generally designated 1, 2, 3, and 4. As may be noted in FIGURE 1 presses 2 and 4 are of a substantially smaller size than presses 1 and 3, and thus presses 2 and 4 will hereinafter be referred to as the small presses while presses 1 and 3 will be referred to as large presses. In order to facilitate the description of our invention, for the most part, the illustrations and description hereinafter are of a rotary pressing machine having a pair of small presses and a pair of large presses mounted on a rotary frame; however, as will be apparent hereinafter the structure and principles of the invention may be used for rotary pressing machines having only presses of a large size mounted on a rotary frame, or presses of a small size mounted on a frame, or any combination of different size presses.

A suitable number of presses such as illustrated in FIGURE 1 may be utilized, depending upon the size and capacity of the unit and the type of work that is to be done by means of the installation. The four presses, as illustrated, are to be spaced around the frame rotary plate 17. The operator station indicated by a floor pattern 37 extends approximately one quarter of the circular path of motion of the plate 17 and presses 1–4 mounted thereon. Next to the terminating edge 38 of the operator station there may be provided a protective guard 40 in which likewise extends through approximately one-quarter of a path of rotation of the rotary plate 17 and the presses mounted thereon. The guard 40 roughly defines the position of the presses at the closing station, it being understood that the guard is somewhat ahead of and behind the position at which the presses close. From the termination of the closing of the press, which is at approximately the position shown of press 4 in FIGURE 1 and continuing in the direction of arrow 35, there is a portion of the path of motion during which the pressing part of the cycle takes place. During this portion of the cycle, the pressing head is closed down upon a buck and is held down as long as air pressure is maintained on the air motor of the press. The opening station is between the positions in which the press 3 is shown in FIGURE 1, which is still closed, and the leading edge 41 of the operator station. At the opening station each press is opened by discontinuing the application of air pressure and exhausting the air motor of the press, whereupon the press will be opened by springs.

The four presses 1–4 (or any other number which are mounted upon the rotary plate 17) may be of any desired types of individually power driven presses. Present day presses are usually air driven and in the embodiment of the invention herein illustrated, presses 1–4 may be of the type shown in Patent Re. 22,041, although it is to be understood that any suitable one or two cylinder press, or other power driven press may be utilized. Thus, for example, presses 1–4 can be single cylinder air driven presses of which the type shown in Patent 2,265,449 is exemplary, or they can be multiple cylinder presses as illustrated.

Figure 14:
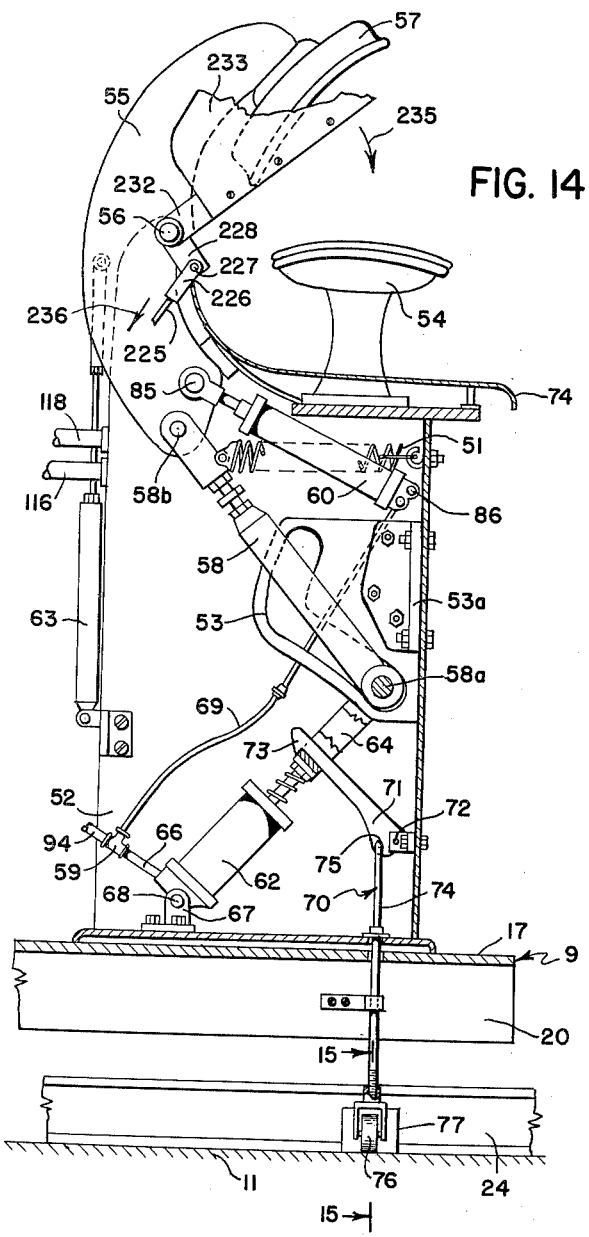
FIGURE 14 is a vertical side view of a press mounted on the turntable, the side panel of the press being removed to illustrate the operating mechanism of said press.
Figure 15:
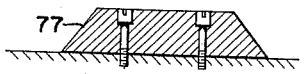
FIGURE 15 is a vertical sectional view of the safety latch operating cam, said view being taken along the line and looking in the direction of the arrows 15—15 of FIGURE 14.

In the simplified showing of the invention illustrated in FIGURES 2 and 14, each of the pressing machines includes a press frame 52, which is suitably secured to the plate 17. On frame 52 there is mounted a stationary buck 54 and a presser arm 55 that at its midportion is pivotally secured to the frame by pivot 56. The presser arm at one end carries a presser head 57, which is movable from an open position as shown for press 4 at the left of FIGURE 2, to a closed position as shown for press 2 at the right in FIGURE 2; it being understood that in most operations press 2 has been "opened" by the time it reaches the position of the press illustrated and press 4 closes upon crossing cam 77, although it is shown in an open position.

The structure for operating the presser head between an open and closed position includes the squeezing cylinder 62, which is pivotally secured at one end to the pivot bracket 67 by pivot 68, said pivot bracket being bolted to the press frame. The outer clevised end of the squeezed cylinder piston rod 64 is pivotally connected at 58a to one end of the linkage member 58, the opposite end of the linkage member being pivotally conected at 58b to the other end of the support arm 55. The pivot connection member 58a is mounted to move in the generally L shaped track 53, which is bolted to the frame by the bracket 53a. A coiled spring 51 is secured at one end to the frame and at the opposite end to the linkage member adjacent pivot 58b, said coiled spring moving the presser head 57 to an open position when air under pressure is no longer being applied to cylinders 60 and 62. Check valve mechanism 63 is connected to the frame 52 and the support arm and is provided to control the rate of opening movement of the support arm and presser head 57.

The closing cylinder 60 has one end pivotally connected at 86 to the frame 52 by pivot 86, while the other end of the piston rod of cylinder 60 is connected to the support arm at a location adjacent pivot 58b by pivot 85. Air is simultaneously supplied to the appropriate ends of the cylinders 60, 62 from the connecting line 94 which at one end is connected to the T-coupling 59, said T-coupling being connected via line 66 to cylinder 62 and line 69 to cylinder 60.

A safety latch assembly 70 is provided to releasably retain the squeeze cylinder 62 and mechanism operated thereby in an open position until the press to which it is connected has passed the terminating edge of the operator station. The assembly 70 includes a latch arm 71 that at one end is pivotally connected by pivot member 72 to the frame and that has a hooked end 73 which "hooks" in the clevis end 64 when the squeeze cylinder has moved to an open position. A rod 74 extending up through an aperture in the rotary frame 9 is pivotally connected at 75 to the latch arm adjacent pivot member 72. The lower clevised end of the rod has secured thereto a roller 76 which normally runs on the floor 11. A cam block 77 is secured to the floor in the path of travel of the roller to move the roller to operate the latch arm to an unlatched position and thereby permit the squeeze cylinder to move the presser arm and head to a press position, said cam block being located just after the terminating edge of the operator station and being of an appropriate horizontal length whereby the latch arm is retained an an unlatched position a sufficient period of time to allow the squeeze cylinder to move out of a latching position relative to cylinder 62. By providing the latch assembly, once the presser head is moved to an open position it is retained in that position until the roller again travels over the cam block (even if air is applied to cylinder 62 prior to the time the roller rides upon the cam block).

In such pressing machines of the nature described, fluid connections are required for conducting these fluids between the stationary surrounding structure and the rotary pressing machine turntable and the presses carried thereby. These fluids are (1) air, for actuating the press operating motors, (2) steam for heating presser heads and bucks, and (3) steam condensate return. Apparatus for conducting the aforementioned fluids from the stationary structure to the individual presses preferably is that set forth hereinafter and described in our copending application, Serial Number 760,777.

As previously set forth, the base plate 10 is secured to the floor 11 by bolts 14 and the stationary vertical tubular pivot housing 12 is mounted on said base plate. The stationary pivot housing extends upwardly through the central aperture 23 formed in the turntable to an elevation above the torus shaped manifolds 80, 91, 92, said manifolds being the air manifold, the steam manifold, and a condensate return manifold, respectively, which are mounted on the rotary turntable and concentric with the pivot housing. An elbow plug 98, which forms a tight seal with the inner periphery of the wall of the housing 12 is mounted in the bottom portion of the housing to seal the lower end thereof.

Mounted within the housing 12 and concentric therewith is a vertically extending condensate return tube 78, the lower end of said tube being in fluid communication thru an opening formed in the plug 98 with the elbow 97 which is connected at the inner end of the main condensate return line 79. The condensate return line 79 extends radially outwardly beyond the track 24.

The rotary gland, generally designated 105, is rotatably mounted on the upper end portion of housing 12 to rotate in the direction of the arrow 35. The rotary gland has two separate fluid channels formed therein and may be of the construction described in our copending application, Serial Number 760,777. One of the aforementioned fluid channels forms a fluid connection between the upper end of the condensate return tube and the inner end of the curved flexible hose 127, which is connected to the port formed in the gland elbow 121. The opposite end of the flexible hose 127 is connected to the upper end of the generally rigid vertically extending pipe 110, the lower end of said pipe being connected to the outer end of the horizontal pipe 111. The other end of the pipe 111 is connected to boss 112 of the condensate return manifold to open into the ring shaped hollow interior 133 thereof. Four spaced internally threaded bosses 114 are formed in the manifold 92 to open into the aforementioned space 133. Threaded in each of the bosses is one end of the condensate connecting line 115, the opposite ends of the connecting lines being connected to the presser heads of one of the presses for returning the condensate therefrom. A steam trap 116 is mounted in the connecting line adjacent the individual press.

Steam is supplied to the individual presses from the stationary main steam supply line 95, which is fluidly connected at its inner end through coupling 100 to the aperture 102 formed in the lower end of the stationary housing, said aperture 102 opening into the annular space 99 enclosed intermediate the tube 78 and the housing 12. The second fluid channel (not shown) of the rotary gland 105 conducts fluid from the annular space 99 in the rotary gland housing 112 through the radially extending coupling 125 into the inner end of the curved horizontally extending flexible hose 126. The outer end of the hose 126 is connected to the upper end of the vertical pipe 117, the lower end of the vertical pipe 117 being connected to the outer end of the radially extending pipe 96. The inner end of the pipe 96 is threaded into the internally threaded boss 135, which opens into the donut shaped space 134 in the steam manifold 91.

Four spaced internally threaded bosses 140 are formed on the steam manifold to open into the annular space 134. In each of the bosses 140 there is threaded one end of a steam connecting line 118, the opposite end of the steam connecting line being connected to the presser head of one of the individual presses for supplying steam to the steam chest formed therein. As may be noted in FIGURES 2 and 14, the respective steam and condensate connections to the presser head are located so that when the presser head is in an open position, the condensate will drain therefrom through the connecting line 115 through the rotary gland, the rotary gland being located at a lower elevation than the connections of the steam line 118 and the condensate return line 115 to the presser head.

The structure for conducting steam to the individual presses and returning condensate therefrom having been described, the structure for conducting air to the individual presses will now be set forth. Air is introduced from the overhead air supply line 81, which is secured to ceiling 47 by a conventional means, such as brackets 82, said supply line having one end located directly above the center of rotation of the turntable 9. One end of the flexible air hose 83 (which may be made of rubber) is fluidly connected to the aforementioned one end of the air supply pipe to depend therefrom. Connected to the opposite end of the air hose is a stationary coupling 87 which in turn has the rotary gland 88 mounted thereon. A rigid horizontally extending pipe 89 fluidly connects the rotary union to the quick exhaust valve 90, which in turn is connected thru pipe 101 to the upper end of the generally rigid vertical pipe 93. The lower end of the pipe 93 is connected to the outer end of horizontal pipe 84, which in turn is connected to open into the hollow interior 132 of the torus shaped air manifold 80. Four spaced internally threaded bosses 136 are formed in the air manifold to open into the annular space 132, one end of each of the flexible tubes 103 being connected to a nipple threaded into a boss 136 and the opposite end being connected to a valve manifold 190 which in turn is fluidly connected through a connecting line 94 to cylinders 60, 62 of the individual presses.

As previously mentioned the manifolds 80, 91, 92 are mounted on the turntable in stacked relationship to one another and mounted concentric to the pivot housing 12, the condensate return manifold being on the bottom and the air manifold 80 being mounted on the top. The structure for securing the manifolds in the aforementioned stacked relationship on the frame include bolts 143 inserted through apertures 144 formed in the offsets 141 of each of the manifolds, said bolts being threaded into appropriate apertures formed in the main flange 16. The bosses on the manifold for the various steam, air and condensate connections are located relative to one another as described in our copending application for similar reasons.

The structure for supplying air to the manifold 80, steam to the individual presses, and returning condensate from the presses having been described, the control structure and mechanism for applying air to and releasing air from the individual presses to operate said presses in succession as they are rotated past the operator station will now be described. The novel control apparatus of this invention, generally designated 150, includes a split ring cam mounting holder 151, that is secured to the top portion of the pivot housing 12 (see FIGURES 3–5). The aforementioned cam holder includes a clamp section 152, which is secured to the second clamp section 153 by bolts 155. The second clamp section is made up of a vertical flange portion 157 and an outwardly extending horizontal plate 154 formed integral therewith. Formed in the horizontal plate are a plurality of sets of inner apertures 158 and outer apertures 159, the inner apertures being equally spaced from the rotational axis of the rotary frame but closer to said axis than the outer apertures, which are likewise equally spaced from said rotational axis. Both an inner aperture and an outer aperture are located on the same radial line that passes through the axis of rotation and are referred to as a set of apertures.

An opening cam 168 for the small presses, an opening cam 169 for the larger presses, and a closing cam 170 for both the large and small presses are retained in stacked relationship on the cam holder by one or more of the cam clamps 171 to 174 inclusive, the shape of the cams and the mounting thereof being as illustrated in FIGURE 5. The cam 170 is in part supported directly on the cam holder and in turn is partially overlayed by the cam 168. The cam 169 includes a depending curved spacer bar 162 that bears on the cam 168 while the outer ends of the cam clamps 171 and 172 are positioned to bear against the top surface of cam 169.

Each of the cam clamps 171–174 is generally rectangular in shape and has offset 175 formed at one end thereof, an aperture 176 formed in the intermediate portion thereof, and a second aperture 177 formed in the opposite end. The apertures 176 and 177 are of the same spacing as the apertures 159, 158. Cap screws 160 are extended through the apertures 176 of the clamps 171, and 172 and thread into the apertures 159 in the cam holder. To retain the aforementioned cams 168, 169, and 170 in the aforementioned stacked relationship, the inner ends of the cam clamps 171, 172 have a cap screw 161 extended through the aperture 177 and threaded into the aperture 158 in the cam holder, there being provided a cylindrical spacer 165 intermediate the cam clamp and the cam holder.

The cam clamp 173 has a cap screw 163 extended through the aperture 176 and threaded into the cam holder. The inner end of the cam clamp 173 is secured to the cam holder by a cap screw 164, there being a spacer 166 provided intermediate the cam clamp 173 and the cam holder and mounted on the cap screw 164. The cam clamp 174 has a cap screw 163 extended through the aperture 176 and threaded into the appropriate aperture in the cam holder. The inner end of the clamp 174 is secured to the cam holder by a cap screw 164, there being a spacer 166 mounted on the cap screw intermediate the cam and cam holder. The outer end portion of cam clamp 174 has a depending offset 175 that bears against the top surface of cam 168, the offset of cam clamp 174 being of the same thickness as cam 168, while the outer end portion of each of cam clamps 171, 172 and 173 has an offset 175 that extends in an upward direction.

By shaping the inner curved portion of each of the cams to have the same radius of curvature, said cams may be accurately positioned in a radial direction with reference to the rotational axis of the rotary pressing machine by setting the cams so that the inner peripheral edge thereof bear against the respective cap screws 160, 163. At the same time, the angular positions of the cams may be radially adjusted by loosening the appropriate cap screws. The adjustment of the cams will be set forth hereinafter.

Secured to the top of the stacked manifold is a mounting ring 180, said ring having offsets 181 in which offset apertures 182 are formed to have bolts 143 extended therethrough. A plurality of spaced openings 183 are formed in the intermediate portion of the mounting ring, each of said openings being spaced an equal radial distance from the pressing machine's axis of rotation and an equal angular distance from one another.

For each individual press on the rotary frame there is provided a valve manifold, generally designated 190 (see FIGURES 4, 8, and 9). Each valve manifold has a generally horizontally extending offset portion 191 formed at one end thereof. An arcuate slot 192 of a shape and a length to overlay two adjacent openings 183 is formed in the offset 191 to have a bolt 195 extended through the slot into an opening 183 for mounting a valve manifold in an adjusted position on the mounting ring 180. A pair of spaced vertical, radially extending flanges 193 is formed integral with the juncture of the offset 191 with the portion 194, said flanges being formed at the transverse edges of the manifold.

The body portion has an upwardly extending land 197 formed thereon. Drilled into the land to extend into the body portion 194 are three spaced vertical openings, 198–200, the openings being an inlet opening 198, a common opening 199, and an exhaust opening 200. A separate horizontally extending port is formed in the body portion to open into each of the aforementioned openings, the port 201 opening into the inlet opening, port 202 opening into the common opening, and the port 203 opening the exhaust opening. A quick exhaust valve 204 is mounted on the valve manifold in fluid communication with the aforementioned port 203 while a connecting line 103 at one end is secured to an air manifold boss 136 and at the opposite end fluidly connected to the inlet port 201. Line 94 connects port 202 to the press cylinders.

A valve 205 is secured on the land 197 by a pair of screws 206 threaded into apertures 207 formed in said land. We prefer a Humphrey valve, however, it is to be understood that other types of valves functioning in the same manner would suffice. The valve 205 has three valve ports (not shown) formed therein, one valve port overlying each of the openings 198, 199, and 200 respectively. The valve includes a plunger 208 that is resiliently urged to an "out" position, said plunger in an "out" position permitting fluid communication between the exhaust opening 200 and the common opening 199. When the plunger is in an "in" position, the common opening 199 is in fluid communication with the inlet opening 198.

The structure for moving the plunger to an "in" position includes a somewhat U-shaped actuator 213 that at one end of leg 213a is pivotally secured to the valve manifold by a bolt 215 which is secured in a bearing 214 that is mounted on the manifold. The leg 213a has an ear 219 having a horizontal bolt 221 threaded therein and locked in an adjusted position by the lock nuts 220. By adjusting the position of the bolt 121, the mount of rotation of the actuator necessary to engage the plunger may be varied.

A horizontal stud 223 that has a spherical bearing 223a at one end and that is threaded at the opposite end is threaded into leg 213b of the actuator and locked in position by the lock nut 224. One end of the flag arm rod 225 is pivotally mounted on the spherical bearing, while on the opposite end of said rod there is a clevised member 226 threaded on the rod to adjust the length of the flag arm rod. The clevised member is pivotally secured at 227 to the outer end of the short radial arm 228. The inner end of the radial arm is fixedly secured to the collar 229, said collar in turn being mounted on the bearing 230. The bearing 230 is rotatably mounted on the reduced outer end portion of the shaft 56 and is retained in position thereon by the cotter pin 231.

Also fixedly mounted on the collar 229 is one end of the radially extending flag support arm 232, the support being offset 90° from the radial arm. The flag 233 is secured to the support arm by a plurality of nuts and bolts 234. The flag is moved to an "up" position as illustrated in FIGURE 14, about the same time as the press on which it is located has moved to a press open position. The structure for moving the flag to the aforementioned position will be described hereinafter.

The weight of the flag in an "up" position causes the support arm to rotate about the shaft 56 in the direction of the arrow 235, which in turn through the arm 228 forces the rod 225 to rotate about the spherical bearing 238a and, at the same time, move in the direction of arrow 236 (see FIGURE 4). Rod 225 moving in the direction of the arrow 236 forces the actuator to pivot about the bolt 215 in the direction of the arrow 237, to bring the stud bolt 221 into engagement with the plunger 208 and move said plunger to an "in" position whereupon air is permitted to pass from the annular air manifold to the valve manifold and thence through line 94 to actuate the cylinders 60, 62 to move the press to a press closed position. The amount of rotational movement about the actuator in the direction of the arrow is limited by the plunger being moved to a fully "in" position.

On each of the actuators 213 adjacent the juncture of the web with the arm 213a thereof there is provided a vertical aperture 245. Each of the actuators for a small press has a cam follower subassembly 241, which includes a vertical bolt 246 mounted in the aperture 245 to extend above the actuator. Rotatably mounted on the upper end of the bolt in vertical spaced relation is an intermediate roller 248 and a bottom roller 247, the intermediate roller being located at an elevation to bear against the opening cam 168 and the bottom roller being located at an elevation to bear against the closing cam 170.

Each of the actuators for a large press has a cam follower sub-assembly 242, which includes a vertical bolt 250 mounted in the aperture 246 to extend above the respective actuator. A bottom roller 247 and an intermediate roller 248 are mounted on the bolt 250 at the same elevation and in the same spaced relation as the rollers 240, 248 are mounted on the bolt 246. Mounted on the bolt 250 at a higher elevation than rollers 247, 248 and at an elevation to bear against the cam 169 is a top roller 252.

The structure of the rotary pressing machine having both large and small presses mounted on the turntable having been described, the operation thereof will now be set forth. For purposes to facilitate the description of the operation, it will be assumed that the individual presses are located as illustrated in FIGURE 1 and that press 1 is already in an open position at the operation station. While the press 1 is in an open position, the operator removes the pressed garment and positions the garment to be pressed on the buck 57 while the press is being rotated through the operator station. Just after the rotary turntable has rotated sufficiently to move the trailing edge 1a of press 1 past the terminating edge 38 of the operator station, the cam roller 56 will roll up onto the cam block 77 and move the latch arm 71 to an unlatched position whereby the support arm and presser head attached thereto may be moved by actuating cylinders 60 and 62, it being understood that the latch arm in a latched position is strong enough to prevent cylinders 60, 62 moving the presser head into a closed position until the latch arm has been moved to an unlatched position.

Each of the cams 168, 169, and 170 has a curved peripheral, vertical center cam surface 168c, 169c, 170c respectively extending through a substantially angular distance and throughout their angular length located the same radial distance from the axis of rotation of the rotary turntable. Each of the opening cams 168, 169 has a generally radially extending vertical front edge 168a, 169a respectively, which are at the maximum radial distance from the rotational axis of the turntable, as illustrated in FIGURE 5, joined with the curved radially and angular extending leading cam surfaces 168b, 169b respectively. The leading cam surfaces 168b, 169b extend both angularly rearwardly from the front edges and radially outwardly from the rotational axis to join with the front end portions of the center cam surface 168c, 169c respectively. The opposite ends of the center cam surfaces 168c, 169c terminate at the rear edges 168e, 169e, which extend generally radially inwardly to the inner peripheral surface of the respective cams.

Cam 170 has a front edge 170a (which corresponds to the front edges 168a, 169a) that at the outer radial end joins with one end of the leading cam surface 170b (which corresponds to the leading edges 169a, 169b but is of a substantially different shape). The leading cam surface 170b at the opposite end joins with the forward end of the center cam surface, said center cam surface at the opposite end terminating at the trailing cam surface 170d which extends radially inwardly through a substantial angular distance to terminate at a rear edge 170e that extends along a radial line inwardly toward the axis of rotation of the turntable.

When the actuator for the large press 1 is in the position illustrated in FIGURE 4, one or more of the rollers 247, 248, 252 mounted on bolt 250 abut against the central cam surface of the respective surface of the respective adjacent cam. As illustrated in FIGURE 4 rollers 247, 248 engaged cam surfaces 170c, 168c respectively, it being noted in this position that the rollers engaging said cam surfaces have forced the actuator on which they are mounted to rotate in the direction of the arrow 260 a sufficient amount so that the stud bolt 221 is out of engagement with the plunger 208. As a result, the plunger 208 for press 1 has moved and is retained in an "out" position whereby the cylinders 60, 62 are in fluid communication with the quick exhaust 204. When the turntable is further rotated in the direction of arrow 35 (from the position illustrated in FIGURE 4), roller 248 is moved angularly past the rear edge 168e, however, roller 247 is still in engagement with cam surface 170c. Still further rotation of the turntable will cause the roller 170 of press 1 to be brought to a position wherein it is adjacent the trailing cam surface 170d. Due to the weight of the flag arm and flag (as previously set forth), roller 247 is retained in engagement with the trailing cam surface 170d, even though through its angular length it curves radially inwardly. The trailing cam surface 170d extends radially inwardly throughout its angular length a sufficient amount so that the actuator rotates about its pivot (in the direction of the arrow 237) to move the plunger to an "in" position such as illustrated for press 4 in FIGURE 4 and thereby applies air under pressure to cylinders 60, 62 of press 1 to actuate said press to a press closed position. It is to be noted that each of the small presses and the larger presses has a roller 247 that bears against the closing cam 170, and as a result, all the presses on the turntable close at the same angular position of the rotational cycle of the turntable.

In the event that the operator or some other party should be in a position to be "caught" or is "caught" between the buck and presser head when the presser head is closed, the flag support arm may be rotated through a small angle in a direction opposite arrow 235, which in turn results in the plunger moving to an "out" position. With the plunger in an "out" position air is quickly exhausted from the cylinders 60, 62 and the coil spring 51 moves the support arm and press head to an open position.

As an example of this safety feature, in one embodiment of the rotary pressing machine, the outer edge of the flag swings through approximately a 70° arc and has a 16 inch "swing" at its outer edge. By moving the flag one inch from its down position, the presser head is moved to an open position. The clevised end 64 of the cylinder 62 in moving to a presser head open position slides beneath the hooked end of the latch arm to be retained in that position until the roller 76 again rolls over the cam block. This provides a safety feature in that it prevents the "accidental" closing of the press, even though the flag support arm is allowed to rotate in the direction of the arrow 235, and thereby move the plunger to an "in" position.

Assuming now that one of the small presses, for example, press 2, has been moved to an angular position whereby rollers 247, 248 are angularly spaced forwardly of the front edge 168a of the small press closing cam, further rotation of the turntable will move the cam follower subassembly 241 of press 2 to place roller 248 in engagement with the cam surface 168b, the forward portions of cam surfaces 168b, 170b being located further radially inwardly toward the rotational axis of the turntable than the rollers 168, 169 and 170 in a press closed position. As the result of the still further rotation of the turntable, the actuator, which has the aforementioned roller 248 connected thereto, is rotated in the direction of arrow 260 to a position that the plunger can be resiliently urged to an "open" position by said roller 248 being moved radially outwardly from the rotational axis.

The continued rotation of the turntable angularly moves the roller 248 of the cam follower sub-assembly of press 2 to a position to bear against the center cam surface 168c of cam 168, cam 168 and closing cam 170 being constructed and mounted so that the respective surfaces 168c and 160c are at least partially angularly overlapped.

It is to be noted that roller 248 is located at an elevation beneath the large press opening cam 169 and that it contacts the leading edge 168 at a later point in the rotational cycle than which the roller 252 contacts the leading cam surface 169b of the large press opening cam. As a result, the small presses will remain in the press-closed position for a larger period of time than the large presses, this being desirable, since it takes a longer period of time to press a garment with a small press and still obtain the same finish that is obtainable with a large press.

The presser head of a large press is actuated to an open position in a manner similar to that described for a small press, the main difference being that the top roller 252 engages the leading cam surface 169b at a point in the rotational cycle prior to the time that the intermediate roller 248 engages the leading cam surface 168b. Even though the top roller 252 of the large press is rotated angularly past the rear end edge 169e of the large press opening cam, the large press still remains in an open position since the intermediate roller 248 moves into engagement with the center cam surface 168c prior to the time the top roller 252 is moved angularly rearwardly of the center cam surface 169c.

In setting up the rotary pressing machine of this invention, to have the various presses thereon open and close at the desired positions in the rotational cycle, first the cams 168, 169 and 170 are loosely clamped onto the cam holder 151 in predetermined positions by structure described heretofore. Then the aforementioned structure is mounted on a stationary housing so that the various cams 168, 169 and 170 are roughly in their final position. At this time the closing cam 170 is adjusted to a position so that the presses will close at the desired point in the rotational cycle of the machine. Now cam bolts 163, 164 of cam clamp 174 are turned on tight so that cam 170 will be firmly held in position and still permit the other cams to be adjusted.

After securing cam 170 in the "final adjusted position," cam 168 is adjusted so that the small presses will open at the proper point of the rotational cycle and then the cam bolts for cam clamp 173 are tightened to firmly hold cam 168 in a "final adjusted position." Similarly, cam 168 is "finally adjusted" to open the large presses at the proper point in the rotational cycle, it being noted that the generally radially extending portion of the leading edge 170b of the closing cam is located a substantially angular distance ahead of the leading cam surfaces of the opening cams. This permits the opening cams to be adjusted through a wide range of angular positions without the danger of the roller 247 being moved radially outwardly prior to the time the rollers 252, 248 engage the respective leading edges of cams 169, 168.

In the event that all the presses of the same size do not open at the same point in the rotational cycle, bolt 195 of the valve manifold of one of the presses is loosened, the valve manifold is rotated relative to the mounting frame 108 and the bolt again tightened. If the arcuate slot 192 is not of sufficient length to permit the valve manifold to be rotated the proper amount, the bolt 195 is removed and reinserted through the arcuate slot and into the next adjacent aperture 183 and tightened. The aforegoing procedure is repeated until all the presses open and close at the desired locations.

From the foregoing description it is apparent that the time of opening and closing of each press may be infinitely adjusted. Further readjusting the "opening" and "closing" of the presses at any time is an easy operation. Additionally the valves are located at a position wherein they may be easily replaced.

Another important feature of this invention is that all of the cam structure for applying air to the cylinders 60, 62 is located off the floor and adjacent the rotational axis of the turntable to prevent stray operation of the individual presses. This, in addition to the safety lock features provided by the latch arm retaining the piston cylinder combination 62 in a press open position except when the roller 76 passes over the cam block 77 and the feature of the flag arm structure that opens the respective press by moving the flag arm in an upward direction a small amount provides additional safety features over that of presses of the prior art.

In the event that all of the individual presses located on the rotary turntable are small presses such as presses 2 and 4, the cam sub-assembly 275 (see FIGURE 10) is used in place of the cam sub-assembly 149 illustrated in FIGURE 5. The cam sub-assembly 275 includes a cam holder mounting bracket 151, cam clamps 171–174, and structure for retaining said cam holders on a cam mounting bracket such as described heretofore. The only cams used for opening and closing the presses are cams 168, and 170 and therefore there is not provided a cam such as cam 169. Thus spacers 166 are used for the cam bolts 163, 164 of cam clamps 171 and 172 in place of spacers 165. The aforementioned cams are of the same configuration as the cams used in the cam sub-assembly 149. In using cam sub-assembly 275, rollers 247 and 248 of the cam follower sub-assembly 241 are used, said sub-assembly being mounted as described heretofore. Thus FIGURE 7 also represents a cross-sectional view of FIGURE 10 showing the cam follower apparatus mounted on the valve manifold and the cam structure of a rotary pressing machine having only small presses. Since it is believed that the operation of a rotary pressing machine having only small presses is obvious from the description set forth heretofore, it will not be further described.

In the event only large presses are mounted on the rotary turntable, then the cam sub-assembly 269 is used in place of the cam sub-assembly 149. The cam sub-assembly 269 includes the cam mounting bracket 151, the cam clamps, and the structure for securing the cam clamps on the mounting bracket which were described with respect to the cam sub-assemblies 149 except that spacers 166 are used in place of spacers 165. The cam sub-assembly 269 includes the opening cam 168 which is of the same shape and size as the opening cam described with respect to the cam sub-assembly 149. In addition, the cam sub-assembly 269 includes a closing cam 270 which has a front edge 270a, a leading cam surface 270b, a center cam surface 270c, a trailing cam surface 270d and a rear edge 270e. Edges 270a and 270e and trailing cam surface 270d are of the same shape and size as the corresponding edges and cam surface of the closing cam 170, while the leading cam surface 270b and the center cam surface 270c are of the same shape but a substantially different angular dimension than the corresponding edge of the cam 170. The center cam surface 270c is of the same shape as the center cam surface 170c. However, it is of a substantially greater angular dimension than the corresponding cam surface of cam 170. The cam follower sub-assembly used with sub-assembly 269 is the same as the cam follower sub-assembly 241 described with reference to FIGURE 7, the roller 248 being at an elevation to bear against the cam 168, and the roller 247 being at an elevation to bear against only cam 270. Thus FIGURE 7 also represents a cross sectional view of FIGURE 12 other than that cam 270 replaces cam 170.

The adjustments of the various cams which properly determine the opening and closing of the presses for the cam sub-assemblies 275, 269 are similar to adjustments described with respect to cam sub-assembly 149, and the operation is the same as using cam sub-assembly 269, except that only large presses are used, and therefore will not be described. By using four different cams, combinations of only large presses, only small presses, or both large and small presses, may be utilized by using the appropriate cam sub-assembly.

As a result, greater versatility of operation is obtainable with fewer structural changes in control structure than is possible with the structure of the prior art.

As many widely apparent different embodiments of this invention may be made without departing from the spirit and scope thereof, it is to be understood that we do not limit ourselves to the specific embodiments herein.

We claim:

1. A rotary pressing machine comprising a rotary frame having thereon a plurality of presses for moving said presses in succession through an operator station and then a pressing station, each of said presses having a buck and a presser head, the latter being mounted for pressing movement toward and away from a press open position in which the presser head is away from the buck, and a press close position in which the presser head is against the buck, each of said presses including motor means connected to the respective presser head for moving said presser head between the aforementioned positions, individual press connecting lines on the frame extending inwardly to a point adjacent the axis of rotation of said rotary frame, a stationary fluid supply line extending to have an inner end adjacent the axis of rotation of the turntable, control means for supplying and disconnecting the supply of fluid from the stationary supply line to the individual connecting lines, said control means mounted adjacent the axis of rotation of said turntable and having a plurality of positions and control operator means for operating said control means through said plurality of positions to alternately supply and disconnect the supply of fluid to actuate each motor means in sequence to move each presser head between a press open position and a press closed position.

2. The apparatus of claim 1 further characterized in that flag means is mounted on each press adjacent the presser head, said flag means being mounted for movement between an "up" position and a "down" position to prevent an operator being caught by a presser head being moved to a press closed position, and that said control means includes means for actuating the flag means toward a "down" position prior to supplying fluid to the motor means for moving said presser head to a closed position.

3. The apparatus of claim 1 further characterized in that means is mounted on each press for preventing the motor means moving the respective presser head to a press closed position prior to the press leaving the operator station.

4. The apparatus of claim 1 further characterized in that each press is moved to a closing station intermediate the operator and pressing station, that each press includes a pivotally mounted support arm for moving the presser head, that the motor means includes a piston-cylinder combination having a piston rod with an outer clevised end connected to the support arm for pivoting said support arm to move the presser head, that each press includes a frame, means mounted on the press frame for latchingly engaging the clevised end piston rod to prevent the movement of the support arm and presser head connected thereto to a press closed position and cam follower means for moving said latching means to an unlatched condition and that cam means are mounted at the closing station to operate each cam follower means to operate each latch means to an unlatched condition as each press enters the closing station.

5. The apparatus of claim 1 is further characterized in that the control means includes valve means for each press for controlling the supply of fluid to the motor means of the respective press, means connected to each valve means for operating each valve means between a position to supply fluid to the respective motor means to close the presser head and a position to disconnect the supply of fluid to the motor means to move the presser head to a press open position, that the control operator means includes a stationary pivot, and cam means mounted on the stationary pivot for actuating the valve operating means to operate each valve between an open position and a closed position.

6. The apparatus of claim 5 further characterized in that flag means are movably mounted on each press for preventing the operator being injured by the closing of the respective presser head, said flag means mounted for movement between an up position and a down position to prevent the operator being injured and means for connecting the flag means to the valve operating means to operate the valve to disconnect the supply of fluid to the respective motor means upon manually moving the flag means from the down position.

7. The apparatus of claim 5 further characterized in that at least one of the presses is a large press and that at least one of the presses is a small press, that for each small press the respective valve operating means includes a first cam follower sub-assembly to control the operation of the valve means connected to the individual line connected to the small press, that for each large press the respective valve operating means includes a second cam follower sub-assembly to control the operation of the valve connected to the individual line connected to the large press, that the cam means includes a cam holder mounted on the stationary pivot, a closing cam for controlling the movement of the first and second cam sub-assemblies to operate the respective valve operating means for supplying fluid to the respective motor means of the press leaving the operator station, and opening cam for controlling the movement of only the second cam follower sub-assembly of each large press to operate the respective valve operating means of the large press to disconnect the supply of fluid to large presses prior to entering the operator station and an opening cam for controlling the movement of the first cam follower sub-assembly of each small press to operate the respective valve operating means of the small press to disconnect the supply of fluid to the small press prior to entering the operator station, said cams being mounted on the cam holder.

8. The apparatus of claim 5 further characterized in that only small presses are mounted on the rotary frame and that each valve operating means includes a cam follower sub-assembly to control the operation of the valve means connected to an individual line and that the cam means includes an opening cam for controlling the movement of the cam follower sub-assembly of each press to operate the respective valve operating means to disconnect the supply of fluid to the respective press prior to said respective press entering the operator station.

9. The apparatus of claim 5 further characterized in that only large presses are mounted on the rotary frame and that each valve operating means includes a cam follower sub-assembly to control the operation of the valve means connected to an individual line and that the cam means includes an opening cam for controlling the movement of the cam follower sub-assembly of each press to operate the respective press prior to said respective press entering the operator station.

10. The apparatus of claim 5 is further characterized in that the control means includes annular means for mounting each of said valve means in any one of a plurality of selected spaced positions, and that each valve means includes a valve manifold having an end portion to be secured to said annular means at one of said selected positions and adjustably movable at the last mentioned selected position and a valve mounted on the valve manifold.

11. The apparatus of claim 10 further characterized in that each valve operating means includes an actuator pivotally mounted on a valve manifold for opening and closing the valve and a cam follower assembly mounted on the actuator to engage the cam means to pivot the actuator to operate the press in proper sequence.

12. The apparatus of claim 11 further characterized in that each press has a flag pivotally mounted thereon for movement between an up position and a down position preventing the operator being caught as the presser head moves to a press closed position, linkage means connecting the flag to the respective actuation for pivoting the flag to an up position as the fluid supply is disconnected from the press motor means.

13. The apparatus of claim 11 further characterized in that the control means includes an annular manifold mounted on the rotary frame for supplying fluid to each of the valve manifolds, a rotary gland connected to said stationary supply line and a short flexible hose placing said rotary gland in fluid communication with the annular manifold.

14. Apparatus for finishing garments having an operator station and a finishing station, comprising a rotary turntable, a plurality of garment finishing units mounted in spaced relation on the rotary turntable to be moved through the operator station and finishing station by the rotary turntable, each of said units having a frame, first and second cooperating means relatively movably mounted on the frame for movement between a loading position and a garment finishing position for finishing a garment, and motor means connected to said first and second cooperating means for moving said first and second cooperating means relative to one another between a garment finishing position and a loading position, means for operating each motor means in sequence, means for permitting each motor means moving the first and second cooperating means relative to one another to a garment finishing position as the respective garment finishing unit is moved from the operator station to the garment finishing station, and manually operated safety means on each garment finishing unit for actuating the respective motor means to move the garment finishing means to a garment loading position when the unit has been moved from the pressing station.

15. Apparatus for finishing garments having an operator station and a finishing station, comprising a rotary turntable, a plurality of garment finishing units mounted in spaced relation on the rotary turntable to be moved through the operator station and finishing station by the rotary turntable, each of said units having a frame, first and second cooperating means relatively movably mounted on the frame for movement between a loading position and a garment finishing position for finishing a garment, and motor means connected to said first and second cooperating means for moving said first and second means relative to one another between a garment finishing position and a loading position, means for operating each motor means in sequence, said motor means including a fluid actuated member, said motor operating means including an individual line on each motor means for applying fluid under pressure to the fluid actuated member, a stationary fluid supply line and means connecting the stationary supply line to the individual lines to alternately supply fluid to said lines and discontinue the supply of fluid to said lines, said last mentioned means including a control for each individual line for alternately permitting passage of fluid under pressure through the individual line and discontinuing the supply of fluid under pressure to the individual line, an actuator for each control to operate the controls in the aforementioned manner, the actuators being mounted on the rotary turntable, and means located adjacent the center of the turntable for operating said actuators in sequence whereby the first and second cooperating means of each garment finishing unit is moved relative to one another to a garment finishing position as each unit enters the pressing station and the first and second cooperating means of each unit assumes a garment loading condition prior to entering the operator station.

16. The apparatus of claim 15 further characterized in that the garment finishing means is steam heated, that means including a stationary steam supply line and stationary condensate return line are provided for supplying steam and returning the condensate from each unit on the turntable, and that the means for supplying fluid under pressure to the individual lines includes a manifold on the turntable, each control being fluidly connected to the manifold and to an individual line, said actuator operating means being stationarily mounted, said actuators and controls being mounted on the manifold to position the actuators to engage the actuator operating means.

17. A pressing machine having a rotary turntable upon which are mounted a plurality of presses that are movable in succession past an operator station, a closing station, then through a pressing zone and an opening station and then again through said operator station and in which said presses each have a buck and a heated pressing element mounted for movement toward and away from said buck, means for normally biasing said pressing element away from the buck, fluid motor means for moving said pressing element against said buck and holding said pressing element against said buck as long as fluid under pressure is applied to said motor means, a stationary fluid supply line extending to have an inner end adjacent the axis of rotation of the turntable, a fluid line for each press mounted on the turntable and extending from the respective individual press to have an inner end adjacent the axis of rotation of the turntable, means mounted adjacent the axis of rotation for conducting fluid between the inner ends of the individual press fluid lines and the stationary line, the last mentioned means including control means for applying fluid under pressure to each press as it enters the closing station and discontinuing application of fluid under pressure to each press as it enters the opening zone, said control means including a valve for each press fluidly connected to the respective individual press fluid line, each valve having a valve member mounted for movement between a valve open position and a valve closed position, said valve mounted on the turntable for movement therewith, cam followers connected to each valve for actuating each valve member between the valve open position and the valve closed position and cam means stationarily mounted adjacent the rotational axis of the turntable for operating the cam followers to open each press in sequence prior to movement through the operator station.

References Cited in the file of this patent

UNITED STATES PATENTS

| | | |
|---|---|---|
| 2,556,477 | Leef | June 12, 1951 |
| 2,867,923 | Langen | Jan. 13, 1959 |
| 2,938,286 | Dugger | May 31, 1960 |